(12) United States Patent
Hiroi et al.

(10) Patent No.: US 6,306,540 B1
(45) Date of Patent: Oct. 23, 2001

(54) BATTERY ELECTROLYTIC SOLUTION WITH FLUORIDE-ION-DISSOCIATING SALT AND BATTERY USING THE SAME

(75) Inventors: Osamu Hiroi; Kouji Hamano; Yasuhiro Yoshida; Shoji Yoshioka; Hisashi Shiota; Jun Aragane; Shigeru Aihara; Daigo Takemura; Takashi Nishimura; Makiko Kise; Hiroaki Urushibata; Hiroshi Adachi, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/642,667

(22) Filed: Aug. 22, 2000

Related U.S. Application Data

(63) Continuation of application No. PCT/JP98/05794, filed on Dec. 22, 1998.

(51) Int. Cl.$^7$ ........................................ H01M 6/04
(52) U.S. Cl. ................... 429/199; 429/323; 429/188; 429/189; 429/231.95
(58) Field of Search ................... 429/231.95, 188, 429/189, 323, 199

(56) References Cited

U.S. PATENT DOCUMENTS

| | | | |
|---|---|---|---|
| 4,482,616 | * 11/1984 | Connelly et al. | 429/101 |
| 5,168,019 | 12/1992 | Sugeno . | |
| 5,411,820 | * 5/1995 | Chaloner-Gill | 429/192 |
| 6,022,643 | * 2/2000 | Lee et al. | 429/324 |

FOREIGN PATENT DOCUMENTS

| | | |
|---|---|---|
| 61-208758 | 9/1986 | (JP) . |
| 62-217575 | 9/1987 | (JP) . |
| 2-114464 | 4/1990 | (JP) . |
| 4-284372 | 10/1992 | (JP) . |

* cited by examiner

*Primary Examiner*—Stephen Kalafut
*Assistant Examiner*—Angela J. Martin
(74) *Attorney, Agent, or Firm*—Oblon, Spivak, McClelland, Maier & Neustadt, P.C.

(57) ABSTRACT

The present invention relates to an electrolytic solution excellent in stability, and also relates to a battery excellent in battery performance and having an outer structure having light weight. The electrolytic solution contains a supporting electrolyte and a gas formation inhibitor in the solvent. The gas formation inhibitor contains a decomposition product of the supporting electrolyte with formation of a gas in the solvent. It functions as controlling to solution equilibrium in the electrolytic solution participating in decomposition reaction of the supporting electrolyte. A battery is obtained by filling the electrolytic solution between a positive electrode and a negative electrode.

14 Claims, No Drawings

BATTERY ELECTROLYTIC SOLUTION WITH FLUORIDE-ION-DISSOCIATING SALT AND BATTERY USING THE SAME

This application is a Continuation of International Appln. No. PCT/JP98/05794 Filed on Dec. 22, 1998.

TECHNICAL FIELD

The present invention relates to an electrolytic solution used in a battery and to a battery using the electrolytic solution.

BACKGROUND ART

A lithium ion secondary battery has been developed as a secondary battery, which can achieve high voltage and high energy density.

The main components thereof are positive and negative electrodes, and an ion conductive layer disposed between these electrodes. It is possible to obtain a battery, which can be charged and discharged in a larger amount of current by decreasing the resistance with an ion conductive layer. Therefore, an ion conductive layer is required to decrease ion conductive resistance, and the electrodes must be arranged with an appropriate distance therebetween to prevent short-circuit.

In lithium ion secondary batteries in practical use, as disclosed in Japanese Unexamined Patent Publication No. 8-83608 (1996), a porous separator film is used to separate the electrodes from each other by an appropriate distance, and an electrolytic solution for ion conduction is charged between these two electrodes to realize ion migration between them.

A lithium ion secondary battery in practical use has a structure, wherein the above-mentioned components are stored in a solid outer can comprising metal or the like.

A solution obtained by dissolving a lithium salt into a mixed solvent of a main solvent and a sub solvent is employed as the electrolytic solution for the above-mentioned lithium ion secondary battery of prior art, and lithium hexafluorophosphate ($LiPF_6$) is employed as a salt of the electrolytic solution, since the solution and the salt bring about extremely high ion conductivity and high electrochemical stability. Since a non-aqueous electrolytic solution having inferior ion conductivity relative to an aqueous solution needs to be employed in a lithium ion secondary battery, the above mentioned salts securing high ion conductivity are employed without exception.

However, $LiPF_6$ has a disadvantage of thermal unstability, as it has been pointed out that a $LiPF_6$ type electrolytic solution begins to decompose at a lower temperature than an electrolytic solution containing a salt such as $LiBF_4$ through the decomposing reaction shown in the following chemical reaction formula (1).

$$LiPF_6 \rightarrow PF_5(gas) + LiF \quad (1)$$

In the publication 1 (ELECTROCHEMISTRY AND INDUSTRIAL PHYSICAL CHEMISTRY, 65, No. 11, pp. 900–908, 1997), it is described that $PF_5$ formed by the above decomposition reaction is a gas itself, and a decomposition gas is evolved by reacting with solvent molecules. The formation of the gas inside the battery may cause deformation or breakage of the battery outer can.

For this reason, from the viewpoint of a battery design, it is necessary to use a solid outer can, which is difficult to deform or break. But a solid outer can is not preferable from the viewpoint of a battery energy density because of its heavy weight and large volume.

Moreover, as the decomposition reaction shown in the formula (1) proceeds, the concentration of $LiPF_6$ undesirably decreases, which reduces ion conductivity of an electrolytic solution.

The present invention has been contrived to solve these problems, and an object of the present invention is to provide a battery electrolytic solution having excellent stability, and also to provide a battery with excellent battery characteristics and a lightweight outer structure.

DISCLOSURE OF INVENTION

The first battery electrolytic solution of the present invention comprises a solvent, a supporting electrolyte and an additive, which additive contains a decomposition product of the supporting electrolyte in the solvent. Since decomposition of the supporting electrolyte is inhibited by the electrolytic solution, it prevents ion conductivity of the electrolytic solution from decreasing to improve the stability thereof.

The second battery electrolytic solution of the present invention comprises a solvent, a supporting electrolyte, and a gas formation inhibitor, which gas formation inhibitor contains a decomposition product of the supporting electrolyte with the formation of a gas in the solvent. Because of the electrolytic solution, stability of the supporting electrolyte is improved, and it prevents gas from forming, which improves the stability thereof.

The third battery electrolytic solution of the present invention comprises the second battery electrolytic solution, wherein the supporting electrolyte is a salt dissociating fluoro complex ions in the solvent, and the gas formation inhibitor is a fluoride-ion-dissociating salt in the solvent. By the electrolytic solution, ion conductivity becomes excellent, and it prevents gas from forming, which improves the stability thereof.

The fourth battery electrolytic solution of the present invention comprises the third battery electrolytic solution, wherein the supporting electrolyte is $LiPF_6$. By the electrolytic solution, ion conductivity becomes extremely high, electrochemical stability becomes excellent, and the gas formation is inhibited, which improves the stability of the electrolytic solution.

The fifth battery electrolytic solution of the present invention comprises the third battery electrolytic solution, wherein the supporting electrolyte is $LiPF_6$, and the gas formation inhibitor is a salt that dissociates fluoride ions and cations, which constitute a battery reaction in the solvent. By the electrolytic solution, the gas formation is inhibited without adversely effecting the battery reaction, which improves the stability and achieves excellent electrochemical stability.

The sixth battery electrolytic solution of the present invention comprises the fifth battery electrolytic solution, wherein the gas formation inhibitor is LiF. By the electrolytic solution, the gas formation is inhibited without adversely effecting battery reaction when the electrolytic solution is used as the electrolytic solution in a lithium ion secondary battery to improve its' stability.

The seventh battery electrolytic solution of the present invention comprises the second battery electrolytic solution, which contains the gas formation inhibitor in an amount more than its solubility at room temperature. By the electrolytic solution, the effect of inhibiting the gas formation at a high temperature becomes large. Furthermore, a safer battery can be obtained, which has small possibility of deformation or breakage when the battery is maintained at a high temperature.

The first battery of the present invention is the battery, which is obtained by filling the electrolytic solution of any one of the above-mentioned 1 to 7 between a positive electrode and a negative electrode. By the electrolytic solutions, battery characteristics become stable, and the outer structure becomes light.

BEST MODE FOR CARRYING OUT THE INVENTION

The battery electrolytic solution of the present invention comprises a solvent, a supporting electrolyte and an additive.

The additive contains a decomposition product of the supporting electrolyte in the solvent, and also contains a material participating in the decomposition reaction of the supporting electrolyte. Equilibrium in the electrolytic solution is controlled to the direction wherein the supporting electrolyte is not decomposed. As a result, ion conductivity of the electrolytic solution is prevented from decreasing, the electrolytic solution is stabilized, and a safe battery having high performance can be obtained by using the electrolytic solution. This is the fundamental principle of inhibiting decomposition of the supporting electrolyte in the electrolytic solution.

Another battery electrolytic solution of the present invention comprises a solvent, a supporting electrolyte, and a gas formation inhibitor.

The gas formation inhibitor corresponds to the above-mentioned additive, and contains a material formed with the formation of a gas during the decomposition of the supporting electrolyte to control the solution equilibrium in the electrolytic solution participating in the decomposing reaction of the supporting electrolyte. Namely, the gas formation inhibitor contains a material formed with the formation of gas during decomposition of the supporting electrolyte, and the gas formation is inhibited by controlling the solution equilibrium to the direction wherein the supporting electrolyte is not decomposed. Therefore, the gas formation in the electrolytic solution can be inhibited, the supporting electrolyte is stabilized, and a safe battery having high performance can be obtained by employing the electrolytic solution.

When a salt that dissociates $F^-$ is employed as the gas formation inhibitor in an electrolytic solution which contains a salt dissociating fluoro complex ions having high ion conductivity, particularly $LiPF_6$ as the supporting electrolyte, a safe battery can be obtained, which has little possibility of deformation or breakage when the battery is maintained at a high temperature.

When $LiPF_6$ is used as the supporting electrolyte, $LiPF_6$ decomposes at a high temperature according to the following decomposition reaction formula (1).

$$LiPF_6 \rightarrow PF_5(gas) + LiF \quad (1)$$

The thus-formed $PF_5$ is not only a gas itself, but it also reacts with a solvent to form another gas.

Although the decomposition reaction proceeds rapidly at a temperature of at least 150° C., it is considered that the reaction is in solution equilibrium as shown in the following formula (2) in the 5 electrolytic solution at a lower temperature.

$$PF_6^- \leftrightarrow PF_5(gas) + F^- \quad (2)$$

By changing a concentration of the material participating in the equilibrium in the solution, the equilibrium can be shifted to either the left side or the right side. Namely, in order to inhibit the decomposition of $PF_6^-$, the equilibrium needs to be shifted to the left direction, and it is effective to increase the materials on the right side. To be more specific, the decrease of ion conductivity of the electrolytic solution can be inhibited, since the decomposition of $PF_6^-$ is inhibited by increasing the concentration of the material formed with the formation of a gas ($PF_5$), that is, the concentration of $F^-$ in the above reaction formula, to inhibit the reduction in the concentration of the supporting electrolyte in the electrolytic solution.

As the material that dissociates $F^-$ and thus increase the concentration of $F^-$ in the solution, various salts can be employed. For the purpose of obtaining a safer battery without a bad effect on battery reactions in a battery such as a charge/discharge capacity, a salt having the same cations as the ions composing the battery reaction, that is, Li salt in a lithium ion secondary battery is preferable. As the material used for controlling the $F^-$ concentration, lithium fluoride (LiF) is the most preferable. LiF has a poor solubility in an electrolytic solution and a rather low resolution, but a concentration of the fluoride ion in the solution is inherently very low, which allows a slight increase in the $F^-$ concentration to have an effect on controlling the above-mentioned equilibrium.

Although the above description shows the case in which $LiPF_6$ is used as the supporting electrolyte, $LiAsF_6$ or $LiBF_4$ can be employed to inhibit the decomposition by the same principle.

Thus, the stability of $LiPF_6$ in the electrolytic solution can be improved by adding a material which controls the equilibrium of the electrolytic solution participating in the decomposition reaction of the supporting electrolyte.

A battery with the above electrolytic solution is unlikely to deform or break, because the internal pressure does not easily rise if the battery is subjected to high temperature. Because of the reduced internal pressure, it is possible to provide a light-weight and thin outer structure, and thereby provide a battery with a high energy density.

Specific examples are described as follows.

Comparative Example 1

Preparation of Electrolytic Solution

Ethylene carbonate and ethyl carbonate were mixed in a volume ratio of 1:1 to prepare a solvent, and $LiPF_6$ powder as the supporting electrolyte was dissolved thereto to adjust a concentration thereof to 1 mol/l.

Preparation of Electrode

A positive active material paste was prepared by mixing 87% by weight of $LiCoO_2$ as an active material, 8% by weight of conductive graphite powder, 5% by weight of poly(vinylidene fluoride) as a binder resin, and NMP (N-methyl rrolidone) as a solvent. The prepared paste was applied to a thicknes of 200 μm and dried on a current collector comprising a 20 μm-thick aluminum foil by a doctor blade process. It was rolled to a thickness 120 μm to prepare a positive electrode.

A negative active material paste was prepared by mixing 95% by weight of carbon powder (trade name of mesophase micro bead carbon available from Osaka Gas Co., Ltd.) as an active material, 5% by weight of poly(vinylide fluoride) as a binder resin, and N-methylpyrrolidone (herein ter referred to as "NMP") as a solvent. The prepared paste was applied to a thickness of 200 μm and dried on a current-collector comprising a 12 μm-thick copper foil by a doctor blade process. It was rolled to thickness of 120 μm to prepare a negative electrode.

The prepared positive and negative electrodes were cut to have a size of 5 cm×4 cm, and a terminal (tub) for current collection was attached to an end of each of the electrodes.

Preparation of Battery Assembly

A separator (trade name of CELL GUARD #2400 available from Hoechst Celanese) sandwiched by the two electrodes to form an electrode lamination, and the above-mentioned electrolytic solution was poured while the elec de lamination was fixed not to be separated from each other. After a pouring of the electrolytic solution, any excess electrolytic solution was wiped off. Then, it was packed with an aluminum laminate film d the opening was sealed to complete a battery.

Measurement of Battery Expansion

The battery prepared in the above-mentioned procedure was charged at a constant current (0.25 C) and a constant voltage (4.2 V). The battery was put in a silicone oil bath kept at 85° C. and a weight thereof was measured in the state that it was suspended from overhead. Volume thereof was measured from buoyancy acting on the battery in the oil. Then, the battery was maintained at 85° C. After 24 hours later its volume at 85° C. was measured in the same manner to find that it increased larger than the initial volume. The increase in volume is to considered to result mainly from an increase in the volume of a gas inside the battery.

EXAMPLE 1

A battery was assembled and expansion thereof was measured in the same manner as in Comparative Example 1 except that the electrolytic solution was prepared by dissolving more LiF to have a concentration of 0.18% by weight.

A volume increase of the battery obtained in EXAMPLE 1 was 0.85 when the volume increase in Comparative Example 1 was defined as 1. It indicated an about 15% effect of inhibiting the volume expansion.

EXAMPLE 2

A battery was assembled and its expansion was measured in the same manner as in Example 1 except that 0.05% by weight of LiF was added to the electrolytic solution, which was less than that in Example 1.

The volume increase of the battery obtained in Example 2 was 0.91 when the volume increase in Comparative Example 1 was defined as 1. It indicated an about 9% effect of inhibiting the volume expansion.

EXAMPLE 3

A battery was assembled and its expansion was measured in the same manner as in Example 1 except that 0.5% by weight of LiF was added to the electrolytic solution, which was more than that in Example 1.

Since 0.5% by weight of LiF added at a room temperature was an amount much more than the solubility, all the amount was not dissolved. The electrolytic solution was filled into the battery in a state of suspension.

The volume increase of the battery obtained in Example 3 was 0.82 when the volume increase in Comparative Example 1 was defined as 1. It indicated an about 18% effect of inhibiting the volume expansion.

Comparative Example 2

A battery was assembled in the same manner as in Comparative Example 1 except that the electrolytic solution was used, which contained $LiBF_4$ as the supporting electrolyte in the electrolytic solution in Comparative Example 1. The initial volume of the battery at 85° C. and the volume 24 hours later at 85° C. were measured in the same manner as in Comparative Example 1. The volume of 24 hours later at 85° C. became larger than the initial volume. This increase is considered to result mainly from an increase in the volume of a gas inside the battery.

EXAMPLE 4

A battery was assembled in the same manner as in Comparative Example 2 except that the electrolytic solution was used, wherein LiF was added and dissolved in a concentration of 0.15% by weight. The initial volume of the battery at 85° C. and the volume of 24 hours later at 85° C. were measured in the same manner as in Comparative Example 2.

The volume increase of the battery obtained in Example 4 was 0.89 when the volume increase in Comparative Example 2 was defined as 1. It indicated an about 11% effect of inhibiting the volume expansion.

Comparative Example 3

A battery was assembled in the same manner as in Comparative Example 1 except that the electrolytic solution was used, which contained $LiAsF_6$ as the supporting electrolyte in Comparative Example 1. The initial volume of the battery at 85° C. and the volume of 24 hours later at 85° C. were measured in the same manner as in Comparative Example 1. The volume 24 hours later became larger than the initial volume. This increase is considered to result mainly from an increase in the volume of a gas inside the battery.

EXAMPLE 5

A battery was assembled in the same manner as in Comparative Example 3 except that the electrolytic solution was used, wherein LiF was added and dissolved in a concentration of 0.15% by weight. The initial volume of the battery at 85° C. and the volume of 24 hours later at 85° C. were measured in the same manner as in 5 Comparative Example 3.

The volume increase of the battery obtained in Example 5 was 0.88 when the volume increase in Comparative Example 3 was defined as 1. It indicated an about 12% effect of inhibiting the volume expansion.

EXAMPLE 6

A battery was assembled in the same manner as in Example 1 except that NaF was used in place of LiF in the preparation of the electrolytic solution in Example 1.

When the assembled battery was charged and discharged, a remarkable decrease in capacity was observed, which was considered to be caused by $Na^+$ dissociated from a part of NaF. Although the charge/discharge capacity decreased compared with Example 1, the formation of the gas was inhibited.

EXAMPLE 7

A battery was assembled in the same manner as in Example 1 except that $NH_4F$ was used in place of LiF in the preparation of the electrolytic solution in Example 1.

When the assembled battery was charged and discharged, there flew a current, which was considered to result from an electrochemical side reaction caused by $NH_4^+$ dissociating from a part of NH$_4$F. Although the charge/discharge capacity was decreased, the formation of a gas was inhibited.

If Examples 1 to 3 were compared with Comparative Example 1, it was clear that an electrolytic solution wherein LiF was dissolved inhibited expansion of a battery. In addition, there was no decrease in battery performance.

Example 2 is a case wherein an amount of LiF is small, and it shows an effect of inhibiting the battery expansion less than that in Example 1. This indicates that adding more LiF is effective on to inhibiting the expansion. Due to the poor solubility of LiF in the electrolytic solution, it was difficult to dissolve 0.2% by weight of LiF at a room temperature. Therefore, it can be concluded that it is effective to provide an excess amount of LiF in the battery structure, in order to keep LiF in a saturation state even if its solubility is changed by a temperature change. To be more specific, the more LiF is added, the more its effect becomes. When LiF more than its solubility is added to the electrolytic solution at a room temperature to exist undissolved LiF, the solubility of LiF increases as the temperature rises, and the undissolved LiF starts to dissolve, thereby increasing a concentration thereof in the electrolytic solution. As a result, the effect of inhibiting the expansion becomes higher.

Comparative Example 2 and Example 4 are examples wherein LiBF$_4$ is used as the supporting electrolyte dissociating fluoro complex ions, and Comparative Example 3 and Example 5 are examples wherein LiAsF$_6$ is used as the same supporting electrolyte. In both cases, LiF type additives inhibit battery expansion. In these examples, the principle of the present invention is effective to inhibiting the battery expansion. It is known that an electrolytic solution employing LiBF$_4$ as the supporting electrolyte is inferior in ion conductivity to an electrolytic solution using LiPF$_6$ as the supporting electrolyte. From the viewpoint of battery performance, LiPF$_6$ is more preferable as the supporting electrolyte. Moreover, since LiAsF$_6$ is harmful to humans, LiPF$_6$ is more preferable as the supporting electrolyte.

Example 6 is an example wherein NaF is used as a salt for inhibiting expansion by dissociating F$^-$ as a gas formation inhibitor. In this case, battery performance was significantly reduced compared with Examples 1 to 5 using LiF by electrochemical interference from Na$^+$ dissociated as a cation.

Example 7 is an example wherein NH$_4$F is used as a salt dissociating F$^-$, and it exhibits a large decrease in battery performance as in Example 6.

As described above, from the viewpoint of battery performance, a material containing cations without disturbing battery reactions is used as the supporting electrolyte. When a salt containing Li$^+$ as a cation like LiPF$_6$ is used as the supporting electrolyte, it is preferable to use LiF having the same cation as the salt for inhibiting expansion by dissociating F$^-$.

INDUSTRIAL APPLICABILITY

The present invention can be applied to a lithium ion secondary battery having excellent battery characteristics and provide an outer structure that is light in weight.

What is claimed is:

1. A battery electrolyte, comprising:
   a non-aqueous organic solvent;
   a supporting electrolyte;
   and a fluoride-ion-dissociating salt.
2. The battery electrolyte according to claim 1, wherein said salt is present in said electrolyte in an amount greater than the solubility of said salt in said solvent at room temperature.
3. The battery electrolyte according to claim 1, wherein the supporting electrolyte is at least one selected from the group consisting of LiPF$_6$, LiAsF$_6$ and LiBF$_4$.
4. The battery electrolyte according to claim 1, wherein said salt is at least one selected from the group consisting of LiF, NaF and NH$_4$F.
5. A battery, comprising the battery electrolyte as claimed in claim 1, a positive electrode, and a negative electrode.
6. A method of inhibiting the formation of gas within a battery, comprising adding to said battery the battery electrolyte as claimed in claim 1.
7. A method of improving the stability of a battery, comprising adding to said battery the battery electrolyte as claimed in claim 1.
8. A method of making a battery electrolyte, comprising:
   adding to a battery electrolyte composition:
   a non-aqueous organic solvent,
   a supporting electrolyte, and
   a fluoride-ion-dissociating salt in an amount greater than the solubility of said salt in said solvent at room temperature.
9. The method according to claim 8, wherein said salt is at least one selected from the group consisting of LiF, NaF and NH$_4$F.
10. The method according to claim 8, wherein the supporting electrolyte is at least one selected from the group consisting of LiPF$_6$, LiAsF$_6$ and LiBF$_4$.
11. A battery electrolyte, produced by the process as claimed in claim 8.
12. A battery electrolyte, comprising:
   a non-aqueous organic solvent,
   a supporting electrolyte, and
   a gas formation inhibitor.
13. The battery electrolyte according to claim 12, wherein said inhibitor is present in said electrolyte in an amount greater than the solubility of said inhibitor in said solvent at room temperature.
14. The battery electrolyte according to claim 12, wherein said inhibitor is at least one selected from the group consisting of LiF, NaF and NH$_4$F.

* * * * *